United States Patent
Takigawa et al.

(10) Patent No.: US 6,501,459 B1
(45) Date of Patent: Dec. 31, 2002

(54) INPUT DEVICE FOR GAME MACHINE, AND METHOD OF CONTROLLING POSITION OF CONTROLLER THEREOF

(75) Inventors: Makito Takigawa, Miyagi-ken (JP); Masaaki Sato, Aomori-ken (JP); Junichi Inamura, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/503,657

(22) Filed: Feb. 14, 2000

(30) Foreign Application Priority Data

Feb. 19, 1999 (JP) .......................................... 11-042377
Feb. 24, 1999 (JP) .......................................... 11-047240

(51) Int. Cl.$^7$ ............................................... G09G 5/08
(52) U.S. Cl. ......................................... 345/161; 463/38
(58) Field of Search ................................ 345/156–162; 463/36–47; 74/471 XY; 341/20; 200/6 R

(56) References Cited

U.S. PATENT DOCUMENTS

| 5,263,382 A | * | 11/1993 | Brooks et al. ............. 74/471 X |
| 5,436,640 A | * | 7/1995 | Reeves ........................ 345/161 |
| 5,903,257 A | | 5/1999 | Nishiumi et al. |
| 5,929,846 A | * | 7/1999 | Rosenberg et al. ......... 345/161 |
| 6,104,382 A | * | 8/2000 | Martin et al. ............... 345/161 |

* cited by examiner

*Primary Examiner*—Dennis-Doon Chow
*Assistant Examiner*—Amr Awad
(74) *Attorney, Agent, or Firm*—Brinks Hofer Gilson & Lione

(57) ABSTRACT

A game machine input device for inputting signals to a game machine using a computer includes a sticklike controller, a first bevel gear disposed on the side of one end of the controller, a pair of second bevel gears placed opposed to each other with teeth thereof meshed with teeth of the first bevel gear, and a pair of driving sources respectively connected to the second bevel gears to independently turn the second bevel gears.

7 Claims, 10 Drawing Sheets

INPUT DEVICE FOR GAME MACHINE, AND METHOD OF CONTROLLING POSITION OF CONTROLLER THEREOF

BACKGROUND OF THE INVENTION

1. Field of the Invention

The present invention relates to an input device for a game machine using a computer, which allows a player to enjoy a realistic game in real time on a screen of the game machine by operating a controller such as a control lever.

2. Description of the Related Art

In recent years, game machines using computers (hereinafter referred to simply as "game machines") have rapidly become widespread. With these game machines, a game player can enjoy a game on a display by operating various controllers, such as control keys, control buttons, and control levers, according to a game program previously stored in a computer device or input at the time of game play.

When general-purpose computers are used as game machines according to a game program previously stored or input at the time of game play, keyboards, mice, and the like are used as input devices. In most cases, game machines exclusively for games are used, and game players use input devices exclusively for games that are separate from the game machines.

A so-called stick device is an example of such input devices.

In the stick device, various types of keys, such as a control key and a selection key, and a control lever are provided on a casing substantially shaped like a rectangular parallelepiped (or a variety thereof). By being turned around the turning fulcrum, the control lever is moved in an arbitrary direction, forward, backward, rightward, and leftward, so as to continuously change the actions of persons, operation states of vehicles, and the like according to the game contents on the display.

The game player can enjoy a game projected on the display by appropriately operating various keys with fingers in accordance with the progress of the game.

The above-described stick device is provided with a mechanism for returning the control lever to the neutral point serving as the starting point when the control lever is released, whereas the load to be imposed on the control lever cannot be changed. This interferes with realism, and causes the player to have a complaint and to demand a greater level of realism.

For example, regarding a competition type game, a game using the flow of a river, and the like, there is a demand to change the load to be imposed on the control lever in order to make the games more realistic.

Furthermore, the neutral point is always fixed at a preset position in the above-described stick device, and cannot be changed to other positions.

As a result, when the control lever is moved to a position offset from the neutral point, even if the position after movement is desired to be regarded as a new neutral point and a starting point of subsequent operation, since the control lever returns, in principle, to the initially set neutral point, it is impossible to perform a more realistic operation relative to the new neutral point after lever movement.

For example, in a case in which an actual car climbs a mountain path or the like in a car rally, the load to be imposed on the car, which runs against gravity, is substantially heavier than that when running on level ground. However, since the conventional game machine is designed with no regard to this point, the game player cannot realize the difference between climbing and level running, and climbing in a game is quite different from actual climbing, which lacks realism. Accordingly, there is an increasing demand by users for more realistic games.

SUMMARY OF THE INVENTION

The present invention has been made in view of the above circumstances, and an object of the present invention is to provide a controller position control method in which a game player can operate a controller, such as a control lever, in analog form according to game contents by changing the load imposed on the controller and changing the home position of the controller, so that the game player can enjoy a realistic game in real time on a display of a game machine using a computer.

In order to overcome the above problems, there is provided a game machine input device for inputting signals to a game machine using a computer, the game machine input device including a sticklike controller; a first bevel gear disposed on the side of one end of the controller; a pair of second bevel gears placed opposed to each other with teeth thereof meshed with teeth of the first bevel gear; and a pair of driving sources connected to the second bevel gears to independently turn the second bevel gears.

Preferably, the number of the teeth in the first bevel gear differs from the number of the teeth in the second bevel gears.

Preferably, the shaft of the first bevel gear is slidably supported at both ends by a pair of opposing concave faces.

Preferably, detection means are respectively provided for the pair of second bevel gears to detect the turning directions and angles of the second bevel gears.

Preferably, one or more speed reduction means are interposed between the second bevel gears and the driving sources.

Preferably, a control means is provided to control the turning directions and angles of the pair of second bevel gears based on signals output from the game machine.

In the game machine input device of the present invention, the pair of second bevel gears are independently turned by separately driving the pair of driving sources. In this case, it is possible to incline the controller centered on one end thereof in an arbitrary direction by a combination of the first bevel gear and the second bevel gears, and to change the load according to the inclination.

Since the first bevel gear and the second bevel gears are meshed, the strength of the mechanism is increased. This further strengthens the structure of the entire input device, and permits size reduction.

The controller can be inclined in the X-axis direction by driving the pair of driving sources in the same direction, and in the Y-axis direction by driving the driving sources in opposite directions. Since such driving is troublesome in an actual control, it is convenient for the driving sources to be respectively provided for inclinations in the X-axis direction and the Y-axis direction.

However, when the driving sources are separately driven, the path of the controller is not linear because of the operation mechanism, and deviates from a straight line in accordance with the amount of inclination.

Since the number of teeth in the first bevel gear and the number of teeth in the second bevel gears are different, the path of the controller can be corrected by deviating the teeth number ratio between the first and second bevel gears from one. Therefore, it is possible to improve nonlinearity of the path of the controller when the teeth number of the first bevel gear and the teeth number of the second bevel gears are the same.

Since the shaft of the first bevel gear is slidably supported at both ends by a pair of opposing concave faces, the turning fulcrum of the controller coincides with the center points of the pair of concave faces when the first bevel gear and the pair of second bevel gears are turned, and the turning fulcrum of the controller is prevented from being displaced.

Since detection means are respectively provided for the pair of second bevel gears to detect the turning directions and angles of the second bevel gears, it is possible to independently detect the turning directions and angles of the second bevel gears.

Since one or more speed reduction means are interposed between the second bevel gears and the driving sources, it is possible to increase the driving force applied from the driving sources, and to thereby produce a desired operating force by a small driving source.

Since the control means is provided to control the turning directions and angles of the pair of second bevel gears based on signals output from the game machine, it is possible to change the load to be imposed on the controller according to the game contents displayed on the display of the game machine. Therefore, the sensations of operating the controller becomes closer to actual sensations, and the player can enjoy a realistic game.

According to the above, it is possible to provide a game machine input device in which the load to be imposed on the controller, such as a control lever, can be changed, and which allows the player to enjoy a more realistic game.

According to another aspect of the present invention, there is provided a controller position control method of controlling the position of a controller in an input device for inputting signals to a game machine using a computer, including the steps of: detecting the present position of a sticklike controller having the turning fulcrum at one end; determining whether the present position of the controller coincides with a designated position; regarding the present position of the controller as an operation starting point when the present position coincides with the designated position; and turning the controller around the turning fulcrum so that the present position thereof coincides with the designated position when the present position differs from the designated position and regarding the designated position as an operating starting point of the controller.

Preferably, when the present position of the controller is different from the designated position, the detection of the present position of the controller, the determination of whether the present position of the controller coincides with the designated position, and the turning of the controller around the turning fulcrum are repeatedly performed so that the present position of the controller coincides with the designated position.

In the controller position control method of the present invention, the present position of the sticklike controller having the turning fulcrum at one end is detected, and it is determined whether the present position of the controller coincides with a designated position. When the present position coincides with the designated position, it is regarded as an operation starting point. When the present position of the controller is different from the designated position, the controller is turned on the turning fulcrum so that the present position thereof coincides with the designated position, and the designated position is regarded as an operating starting point.

Therefore, the operation starting point of the controller can be easily changed to an arbitrary position (designated position) offset from the neutral point.

Accordingly, it is possible to control the controller in analog form according to the game contents, and to enjoy in real time a realistic game on the display of the game machine using a computer.

Further objects, features, and advantages of the present invention will become apparent from the following description of the preferred embodiments with reference to the attached drawings.

DESCRIPTION OF THE PREFERRED EMBODIMENTS

A game machine input device according to an embodiment of the present invention will be described with reference to the attached drawings.

Figure 1:
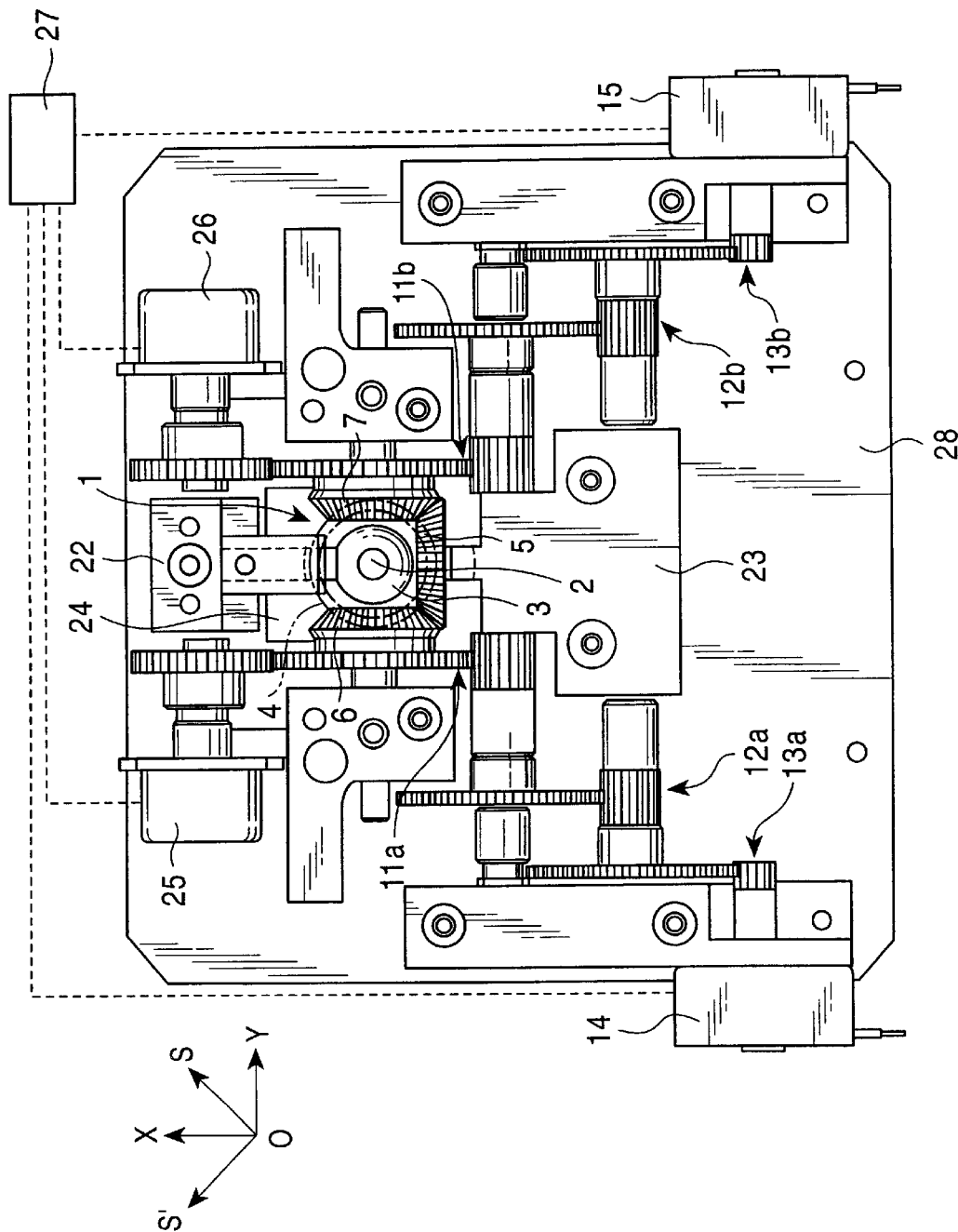
FIG. 1 is a general plan view of a stick device for a computer game machine according to an embodiment of the present invention.
Figure 2:
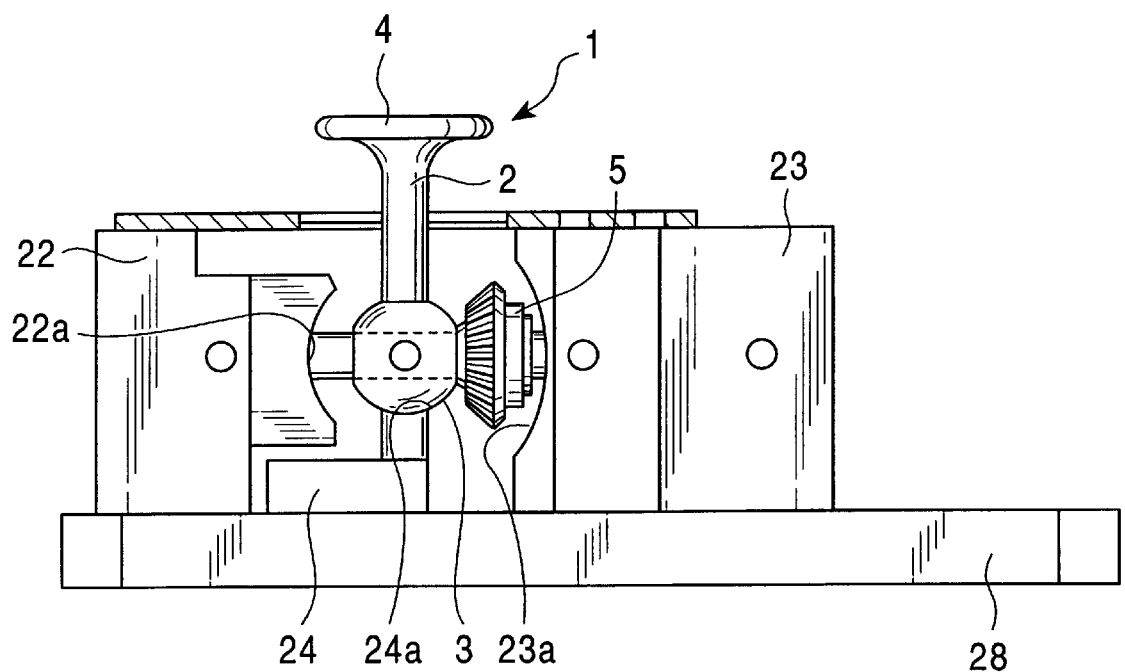
FIG. 2 is a partially broken side view of the stick device.
Figure 3:
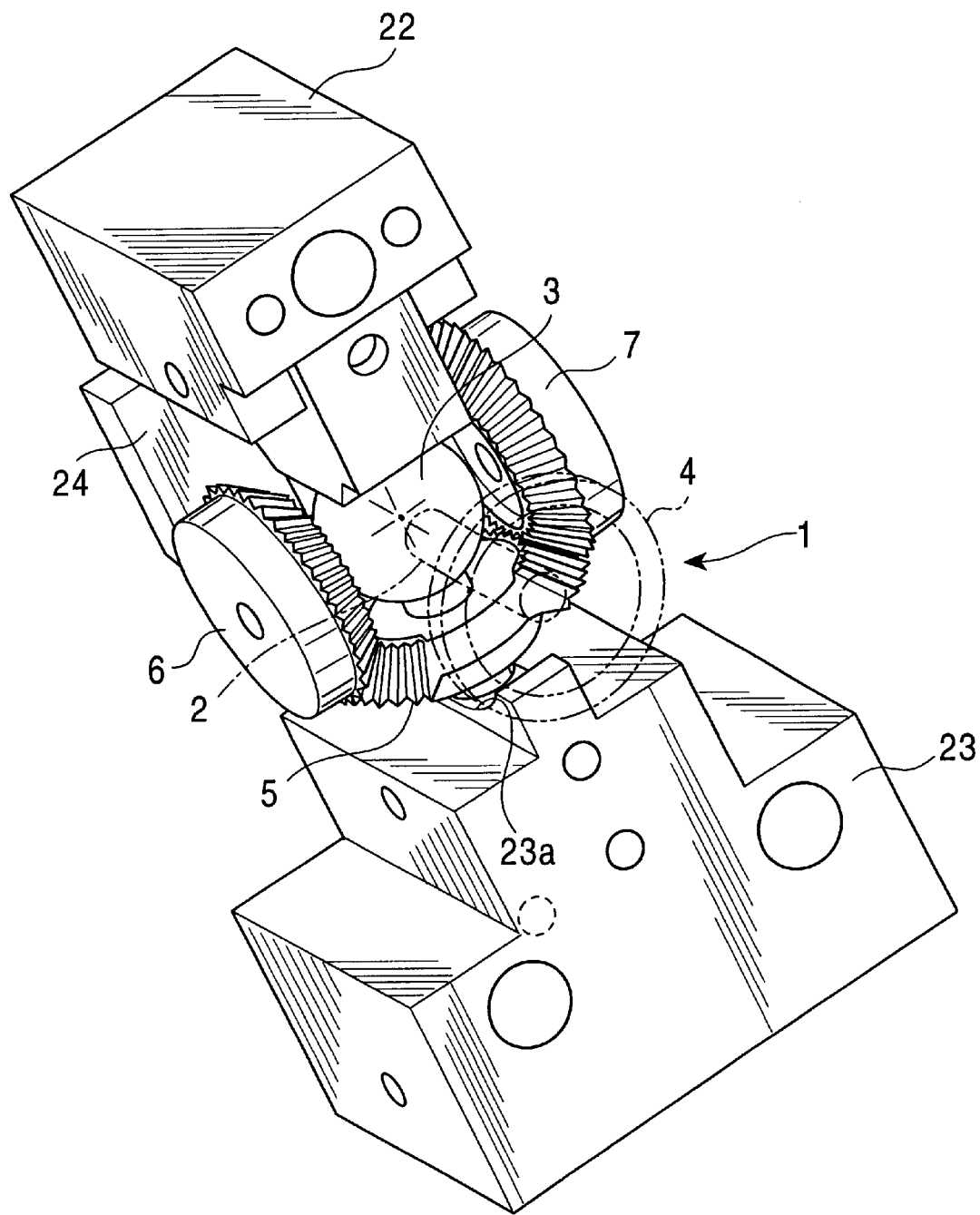
FIG. 3 is a partial perspective view of the stick device.
Figure 4:
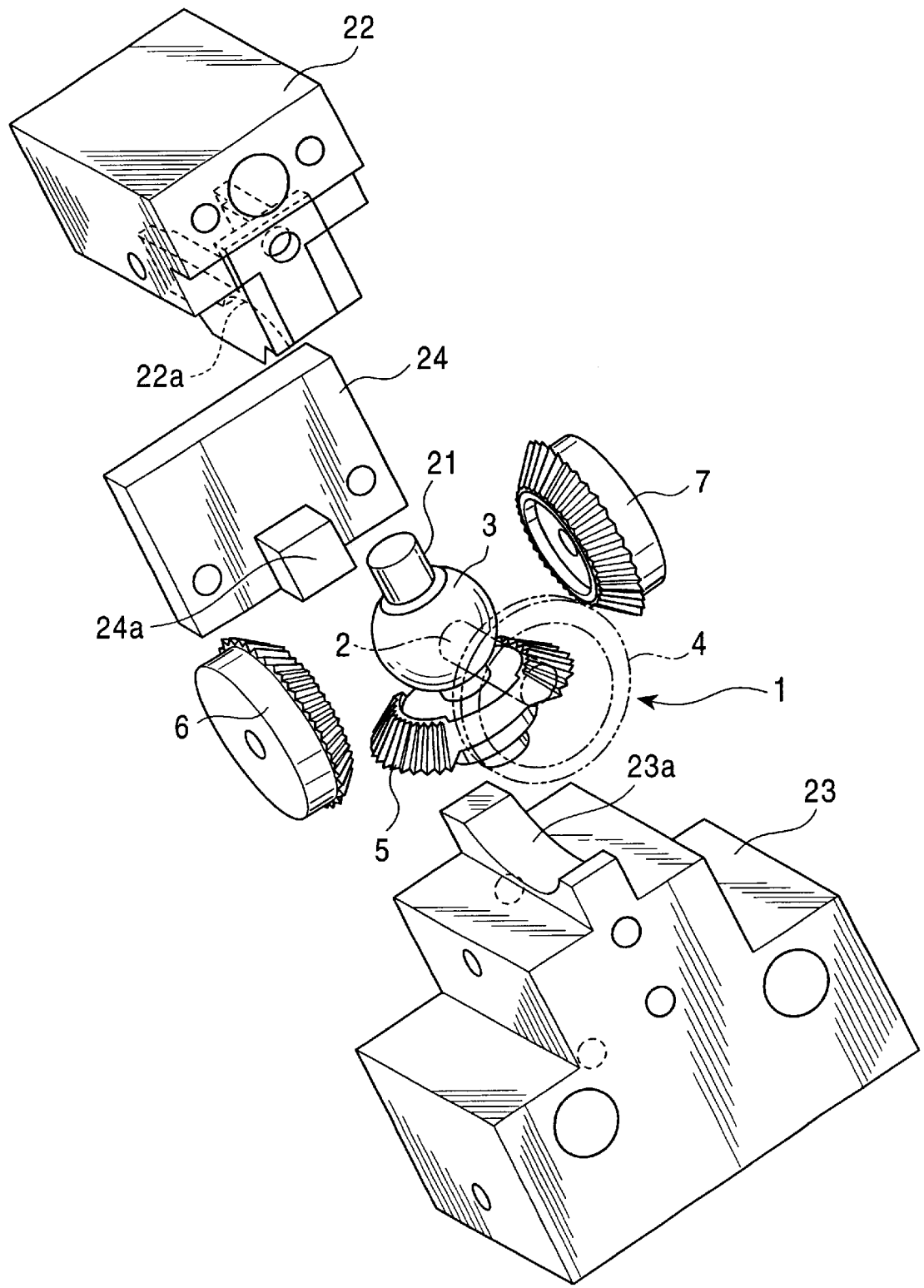
FIG. 4 is an exploded perspective view of the part of the stick device shown in FIG. 3.

FIG. 1 is a general plan view of a stick device for a computer game machine (game machine input device) according to an embodiment of the present invention, FIG. 2 is a partially broken side view of the stick device, FIG. 3 is a partial perspective view of the stick device, and FIG. 4 is an exploded perspective view of the part shown in FIG. 3. In these figures, a stick section (sticklike controller) 1 is composed of a rodlike stick 2, a spherical stick turning portion 3 coaxially mounted at one end of the stick 2, and a substantially disklike stick gripping portion 4 coaxially mounted at the other end of the stick 2.

On the side of the stick turning portion 3 and in one direction orthogonal to the axis of the stick 2, a stick gear (first bevel gear) 5 is fixed so that the surface thereof points toward the stick 2. A pair of bevel gears (second bevel gears) 6 and 7 are placed opposed to each other across the stick turning portion 3. The teeth of the bevel gears 6 and 7 are meshed with the teeth of the stick gear 5. In this embodiment, the number of teeth of the stick gear 5 and the number of teeth of the bevel gears 6 and 7 are set so that there is a difference therebetween, that is, so that the ratio of the teeth number of the stick gear 5 to the teeth number of the bevel gears 6 and 7 is not equal to one.

A driving motor (driving source) 14 is connected to the bevel gear 6 via a plurality of (three in this embodiment) reduction gears (reduction means) 11a to 13a. Similarly, a driving motor (driving source) 15 is connected to the bevel gear 7 via reduction gears 11b to 13b. These motors 14 and 15 are separately controlled so that the bevel gears 6 and 7 turn independently.

A shaft 21 penetrates through the stick turning portion 3 and the stick gear 5 so that both ends thereof protrude outward. Outside both ends of the shaft 21, blocks 22 and 23 are placed opposed to each other across the shaft 21. The opposing faces of the blocks 22 and 23 are provided with concave faces 22a and 23a, respectively, for slidably supporting both ends of the shaft 21. The stick turning portion 3 is slidably supported by a concave face 24a of a block 24 interposed between the blocks 22 and 23.

The bevel gear 6 is provided with a variable resistor (detection means) 25 for detecting the turning direction and angle of the bevel gear 6. Similarly, the bevel gear 7 is provided with a variable resistor 26 for detecting the turning direction and angle of the bevel gear 7. The turning directions and angles of the bevel gears 6 and 7 are controlled by a control section (control means) 27 based on output signals from the variable resistors 25 and 26 and signals output from the computer game machine.

That is, the load to be imposed on the stick section 1 is changed according to game contents displayed on a display of a game machine body (game machine).

The reduction gears 11a to 13a and 11b to 13b, the driving motors 14 and 15, the blocks 22 to 24, and the variable resistors 25 and 26 are fixed on a nearly rectangular plate 28 by fixing devices such as screws, and are housed in a case (not shown) while the stick section 1 protrudes outwardly from the case.

Figure 5:
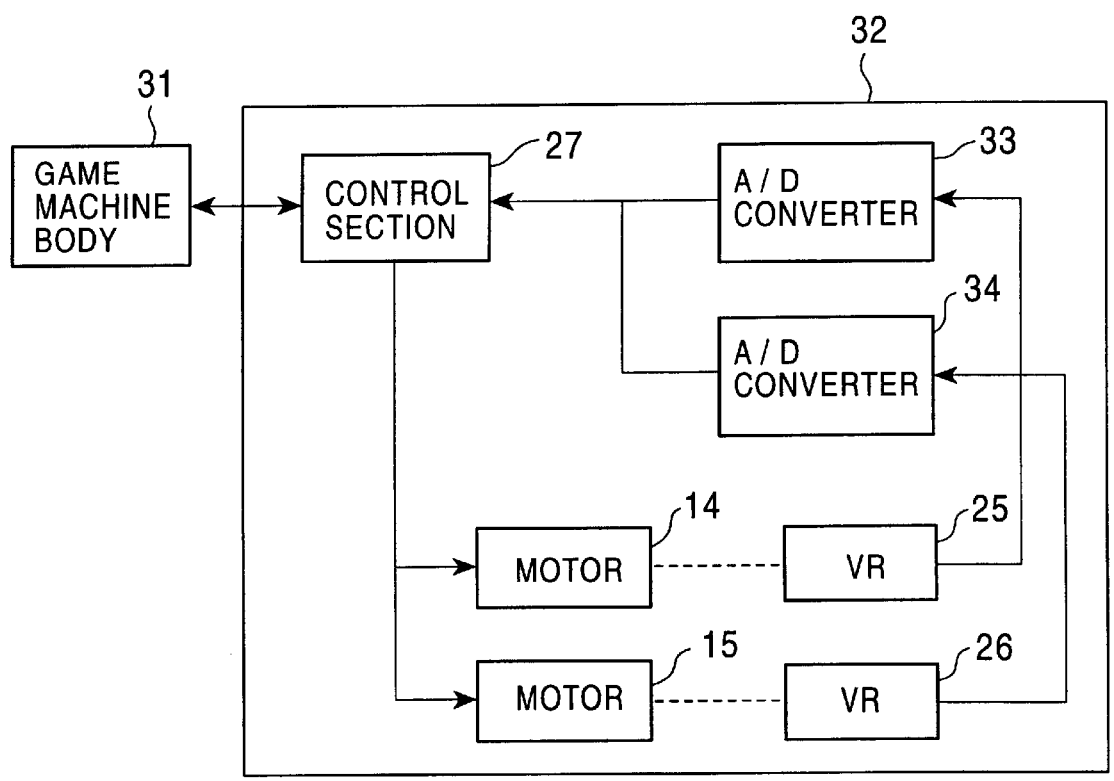
FIG. 5 is a block diagram of a control section in the stick device.

The control section 27 also controls the home position (operation starting point) of the stick section 1 according to the game contents displayed on the display of the computer game machine, and is mounted on a controller pad 32 connected to a game machine body 3, as shown in FIG. 5. In addition to the above-described control section 27, the driving motors 14 and 15, the variable resistors (VR) 25 and 26, and A/D converters 33 and 34, which subject signals from the variable resistors 25 and 26 and the like to analog-to-digital conversion, are mounted on the controller pad 32.

The control section 27 controls the turning directions and angles of the bevel gears 6 and 7 based on output signals from the variable resistors 25 and 26 so that the stick section 1 is turned around its turning fulcrum to incline to an arbitrary angle. More specifically, the control section 27 inputs information about a previously designated position output from the game machine body 31 and information about the turning directions and angles of the bevel gears 6 and 7 output from the variable resistors 25 and 26, thereby recognizing the present position of the stick section 1 as the X and Y coordinates. Then, the control section 27 controls the turning directions and angles of the bevel gears 6 and 7 by driving the driving motors 14 and 15 so that the present position of the stick section 1 coincides with the designated position. The designated position is regarded as the home position of the stick section 1.

In this stick device, the driving force of the driving motor 14 is transmitted to the bevel gear 6 via the reduction gears 11a to 13a, and the driving force of the driving motor 15 is transmitted to the bevel gear 7 via the reduction gears 11b to 13b. The bevel gears 6 and 7 are thereby turned by designated turning angles in designated turning directions, and are given predetermined loads. The variable resistor 25 detects the turning direction and angle of the bevel gear 6, and the variable resistor 26 detects the turning direction and angle of the bevel gear 7.

These detected signals are input to the control section 27, and the present position of the stick section 1 is recognized based on the turning directions and angles of the bevel gears 6 and 7. By then driving the driving motors 14 and 15, the turning directions and angles of the bevel gears 6 and 7 are controlled, and the home position of the stick section 1 is shifted from the neutral point to the designated position in the X-axis direction and the Y-axis direction, independently or simultaneously. After the shift of the home position of the stick section 1 is completed, the driving motors 14 and 15 are stopped in response to signals from the control section 27.

For example, in order to shift the leading end portion of the stick section 1, that is, the stick gripping portion 4 along the X-axis direction in FIG. 1, the driving motors 14 and 15 are driven so that the bevel gears 6 and 7 turn in phase by the same turning angle.

In order to shift the stick gripping portion 4 along the Y-axis direction in FIG. 1, the driving motors 14 and 15 are driven so that the bevel gears 6 and 7 turn in reverse phase by the same turning angle.

In order to shift the stick gripping portion 4 in a direction at an angle 45° to the X-axis and the Y-axis in FIG. 1 (the S-direction in the figure), the driving motor 15 is stopped to stop the turning of the bevel gear 7, and the driving motor 14 is driven to turn the bevel gear 6 by a predetermined turning angle in a predetermined turning direction.

In order to shift the stick griping portion 4 in a direction at an angle 90° to the S-direction in FIG. 1 (the S'-direction in the figure), the driving motor 14 is stopped to stop the turning of the bevel gear 6, and the driving motor 15 is driven to turn the bevel gear 7 by a predetermined angle in a predetermined direction.

In this embodiment, loads in accordance with the turning angles of the bevel gears 6 and 7 are imposed on the stick section 1.

By separately driving the driving motors 14 and 15 in this way, the bevel gears 6 and 7 can be separately turned or stopped. The combination of these operations allows the stick gripping portion 4 to be shifted in all directions through 360° in FIG. 1. In this case, the loads in accordance with the turning angles of the bevel gears 6 and 7 are imposed on the stick section 1.

In a case in which the ratio of the teeth number of the stick gear 5 to the teeth number of the bevel gears 6 and 7 (the teeth number of the stick gear 5/the teeth number of the bevel gears 6 and 7) is set to 1.00, a deviation from the 45° axis occurs. Therefore, the above ratio is set offset from 1.00 to reduce the deviation from the 45° axis. It is preferable that the teeth number of the stick gear 5 be smaller than that of the bevel gears 6 and 7.

When one of the bevel gears 6 and 7 is fixed and the other is turned, the center coordinates (X, Y) of the stick gripping portion 4 are represented as follows:

$(X, Y)=(-R \sin \theta \times \cos \theta, R \sin \theta)$

The motion rate (Y/X) in the (X, Y) direction is $-1/\cos \theta$. $\theta$ represents the half of the turning angle of the bevel gear 6 or 7 (the turning angle of the bevel gear 6 or 7=2$\theta$).

When the stick 2 is inclined ±30° from the neutral point (the direction perpendicular to the main surface of the plate 28) in the X-axis and Y-axis directions and is moved within the range of a circular cone centered on the vertical axis (Z-axis), the inclination of the stick 2 on the 45° axis in the X-axis direction and the Y-axis direction is 22.2°. In this case, the motion ratio Y/X of the center coordinates (X, Y) of the stick gripping portion 4 is 1.080. For this reason, in a case in which the rate of the teeth number of the stick gear 5 to the teeth number of the bevel gears 6 and 7 is 1.00, when one of the bevel gears 6 and 7 is fixed, the other is turned, and the stick 2 is moved on the 45° axis to the greatest extent, a deviation of approximately 8% is produced.

Figure 6:
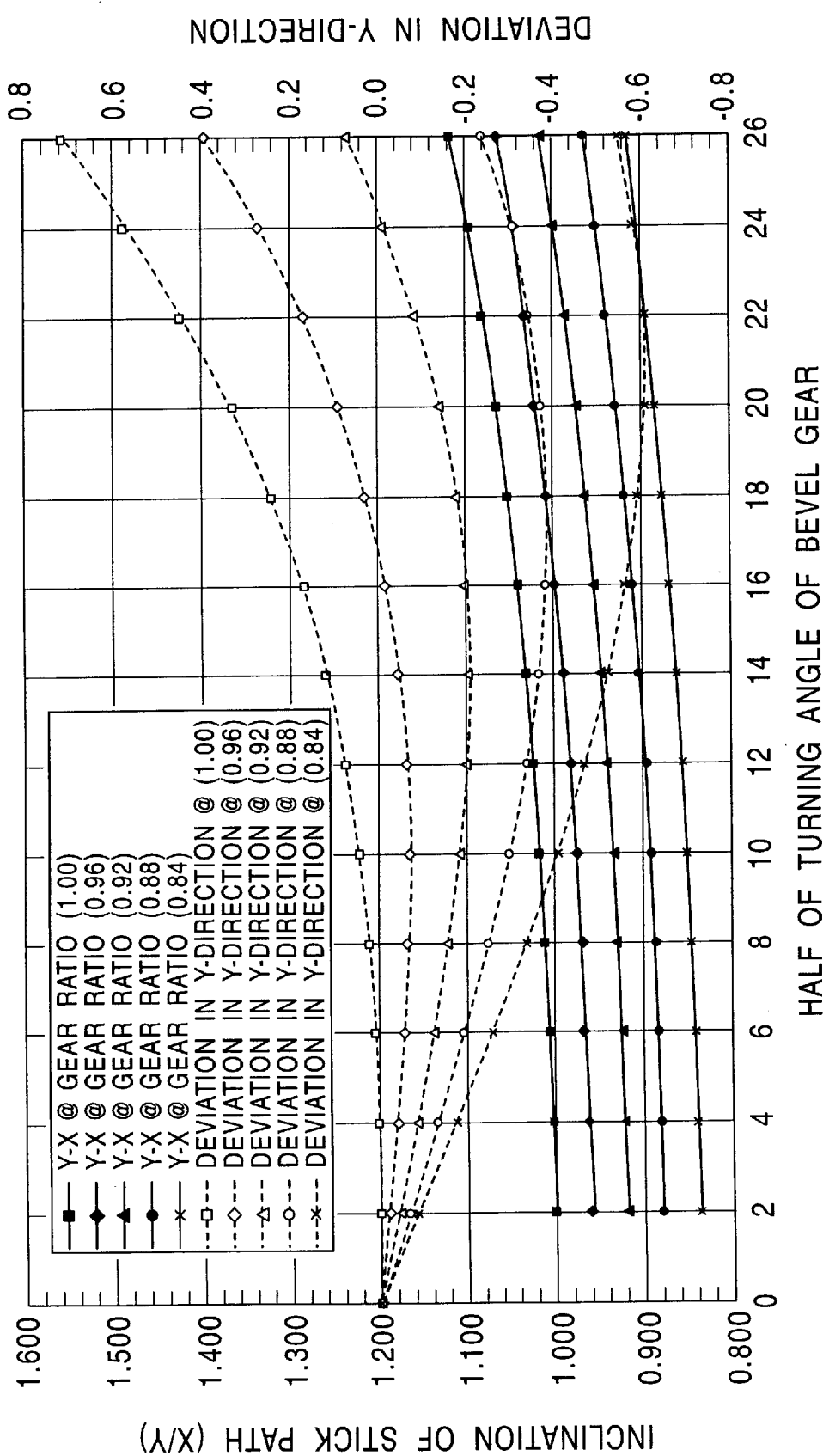
FIG. 6 is a graph showing the inclination (X/Y) of the path of a stick and the deviation from the 45° axis when a difference is made between the number of teeth in a stick gear and the number of teeth in bevel gears.

FIG. 6 is a graph showing the inclination (X/Y) of the path of the stick 2 and the deviation from the 45° axis according to the change in turning amount of the bevel 6 or 7 when there is a difference in teeth number between the stick gear 5 and the bevel gears 6 and 7.

In this graph, the gear ratio means the ratio of the teeth number of the stick gear 5 to the teeth number of the bevel gears 6 and 7 (teeth number of the stick gear 5/teeth number of the bevel gears 6 and 7), five gear ratios, 1.00, 0.98, 0.96, 0.94, and 0.92, are plotted. The deviation in the Y-direction means the deviation from the 45° axis in the Y-direction with respect to the half of the turning amount of the bevel gear 6 or 7. Herein, the deviations are found for the respective ratios, and are plotted as errors.

As is evident from this graph, when the teeth number of the stick gear 5 and the teeth number of the bevel gears 6 and 7 are equal, or when the gear ratio is low (for example, 0.8), the inclination of the path gradually increases as (the half of) the turning amount of the bevel gear 6 or 7 increases, and simultaneously, the deviation in the Y-direction increases.

In contrast, in a case in which a difference is intentionally made between the teeth number of the stick gear 5 and the teeth number of the bevel gears 6 and 7, for example, so that the gear ratio is 0.9, as the turning amount of the bevel gears 6 or 7 increases, the inclination of the path gradually increases from 0.92 toward 1.00, and the deviation in the Y-direction gradually decreases from 0, reaches the minimum value halfway, and then finally returns to 0.

When actually using the game machine input device, the user does not pay attention to the inclination of the path, but to the deviation from the axis.

Therefore, by appropriately setting the ratio between the teeth number of the stick gear 5 and the teeth number of the bevel gear 6 or 7 (gear ratio), it is possible to control the Y-direction deviation within a fixed range in both positive and negative directions, and to eliminate the problems in actual operation.

Figure 7:
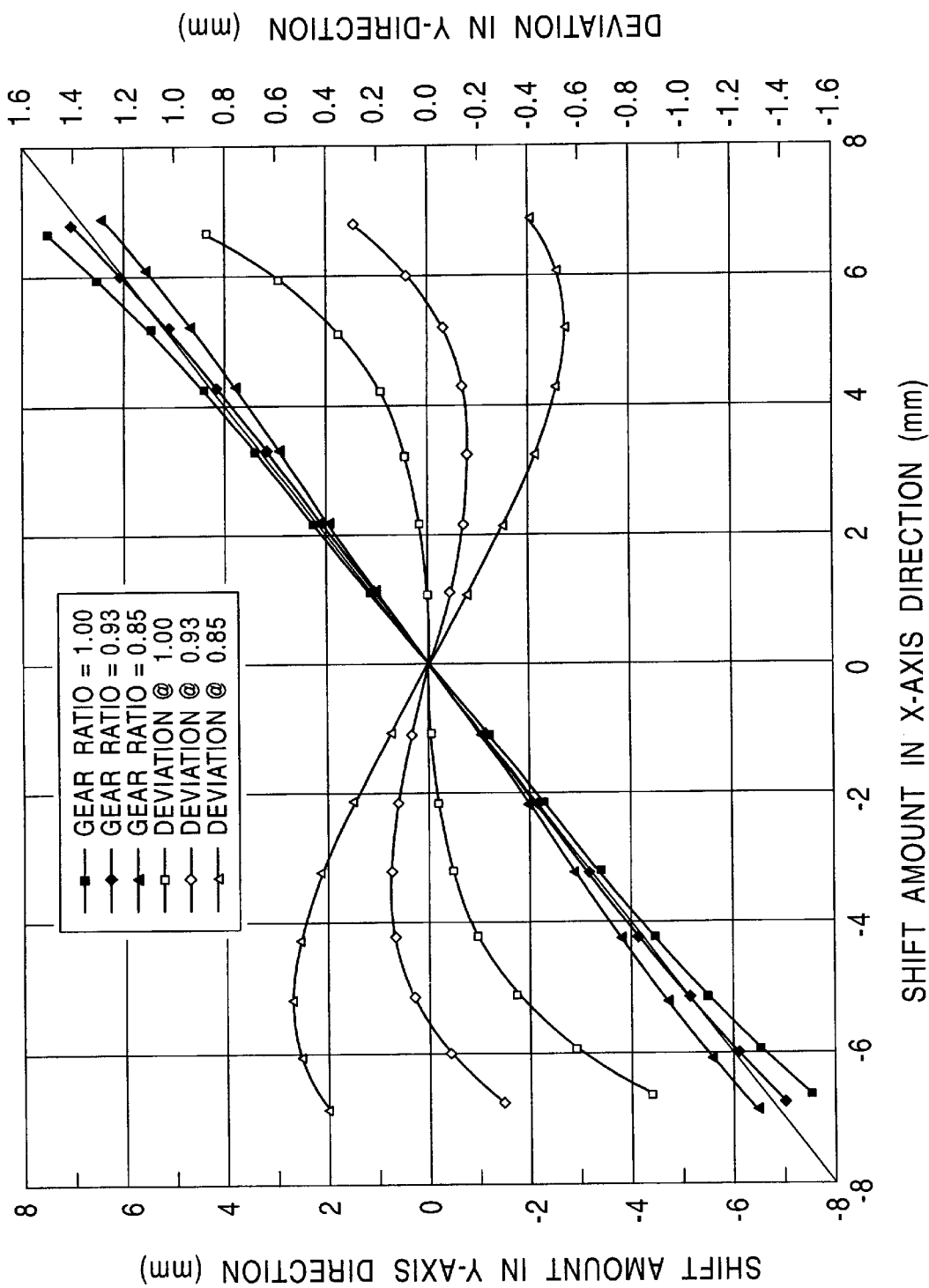
FIG. 7 is a graph showing the path of the stick and the deviation from the 45° axis when a difference is made between the number of teeth in the stick gear and the number of teeth in the bevel gears.

FIG. 7 is a graph showing the path of the stick 2 and the deviation from the 45° axis when an appropriate difference is made between the teeth number of the stick gear 5 and the teeth number of the bevel gear 6 or 7 according to the results of the above consideration.

In this figure, the values when no difference is made (the gear ratio is 1.0) and when an appropriate difference is made (the gear ratio is 0.85) are plotted for comparison.

As is evident from this figure, the path of the stick 2 is substantially S-shaped. When the gear ratio is appropriately set (0.93 in this embodiment), the path intersects the 45° axis at three points, the origin, the first quadrant, and the third quadrant, and the deviation falls within the range of approximately ±0.3 over the entire region.

In contrast, when no difference is made or too great a difference is made in teeth number, the path and the 45° axis intersect only at the origin, and the deviation is approximately ±0.8° at maximum.

Figure 8:
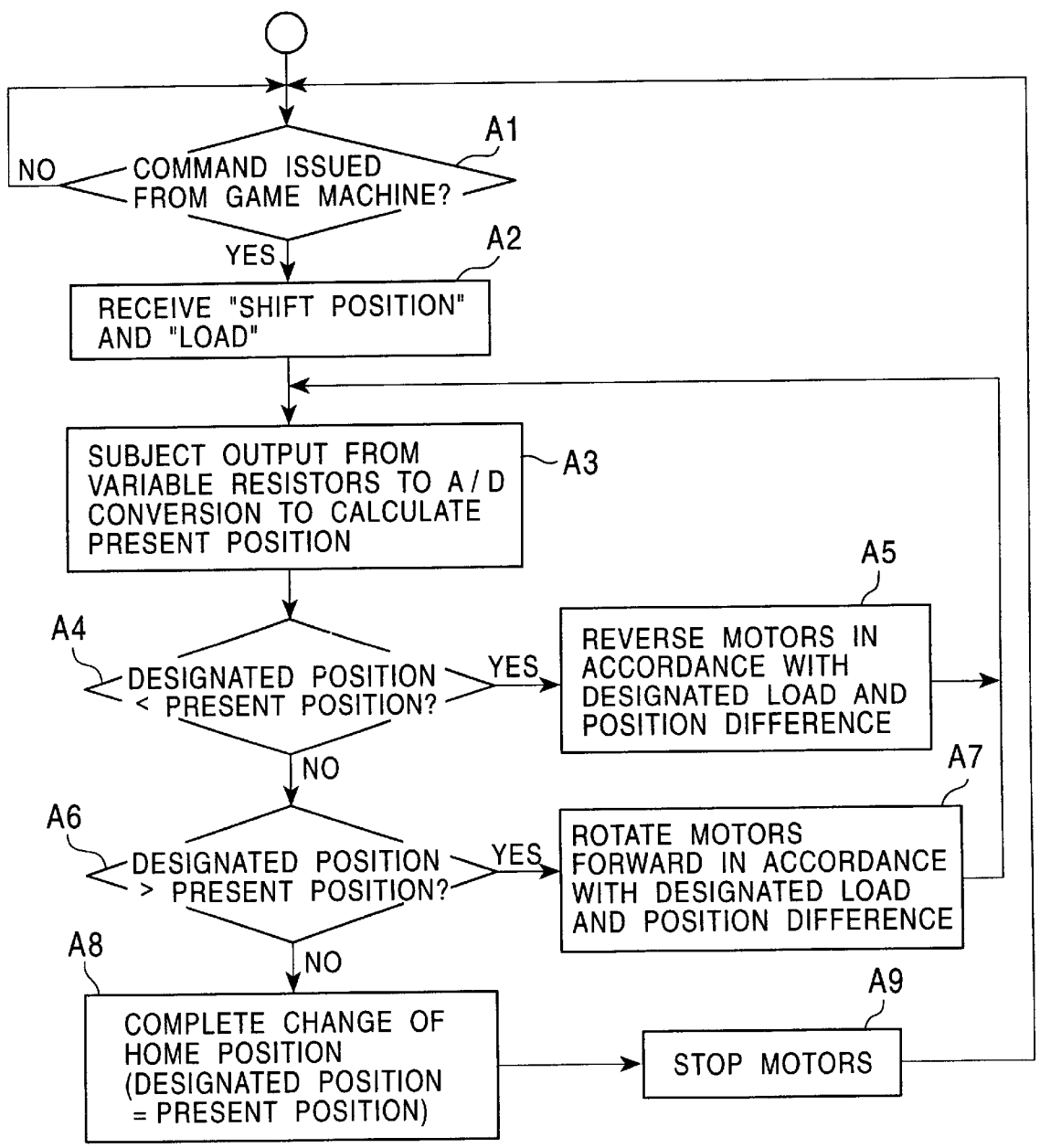
FIG. 8 is a flowchart showing a method of controlling the home position when a request to change the home position of the stick device is received.

Description will be given below of a method of controlling the position of the stick section 1 when a request to change the home position is received, with reference to FIG. 8.

First, it is determined whether a command has been issued from the game machine body 31 (Step A1).

When a command has been issued, information about designated "shift position" and "load" of the stick section 1 are received (Step A2).

When a command has not been issued, it is determined again whether a command has been issued (Step A1).

When the information about "shift positions" and "load" are received in Step A2, output signals from the variable resistors 25 and 26 are converted from analog to digital by the A/D converters 33 and 34, thereby calculating the present position of the stick section 1 (Step A3). The present position of the stick section 1 can be known based on signals regarding the turning directions and angles of the bevel gears 6 and 7 output from the variable resistors 25 and 26.

Subsequently, it is determined whether the present position of the stick section 1 has exceeded the designated position (Step A4).

When the present position has exceeded the designated position, the driving motors 14 and 15 are separately or simultaneously reversed according to the designated load and the position difference to shift the position of the stick section 1 toward the designated position (Step A5). Then, the present position of the stick section 1 is calculated (Step A3).

When the present position of the stick section 1 have not exceeded the designated position, it is determined whether the present position is placed before the designated position (Step A6).

When the present position lies before the designated position, the driving motors 14 and 15 are separately or simultaneously rotated forward according to the designated load and the position difference to shift the position of the stick section 1 toward the designated position (Step A7), and the present position of the stick section 1 is then calculated (Step A3).

In contrast, when the present position does not lie before the designated position, it is determined that the present position coincides with the designated position and that the shift of the home position is completed (Step A8), and the driving motors 14 and 15 are stopped (Step A9), thereby completing the control operation.

Figure 9:
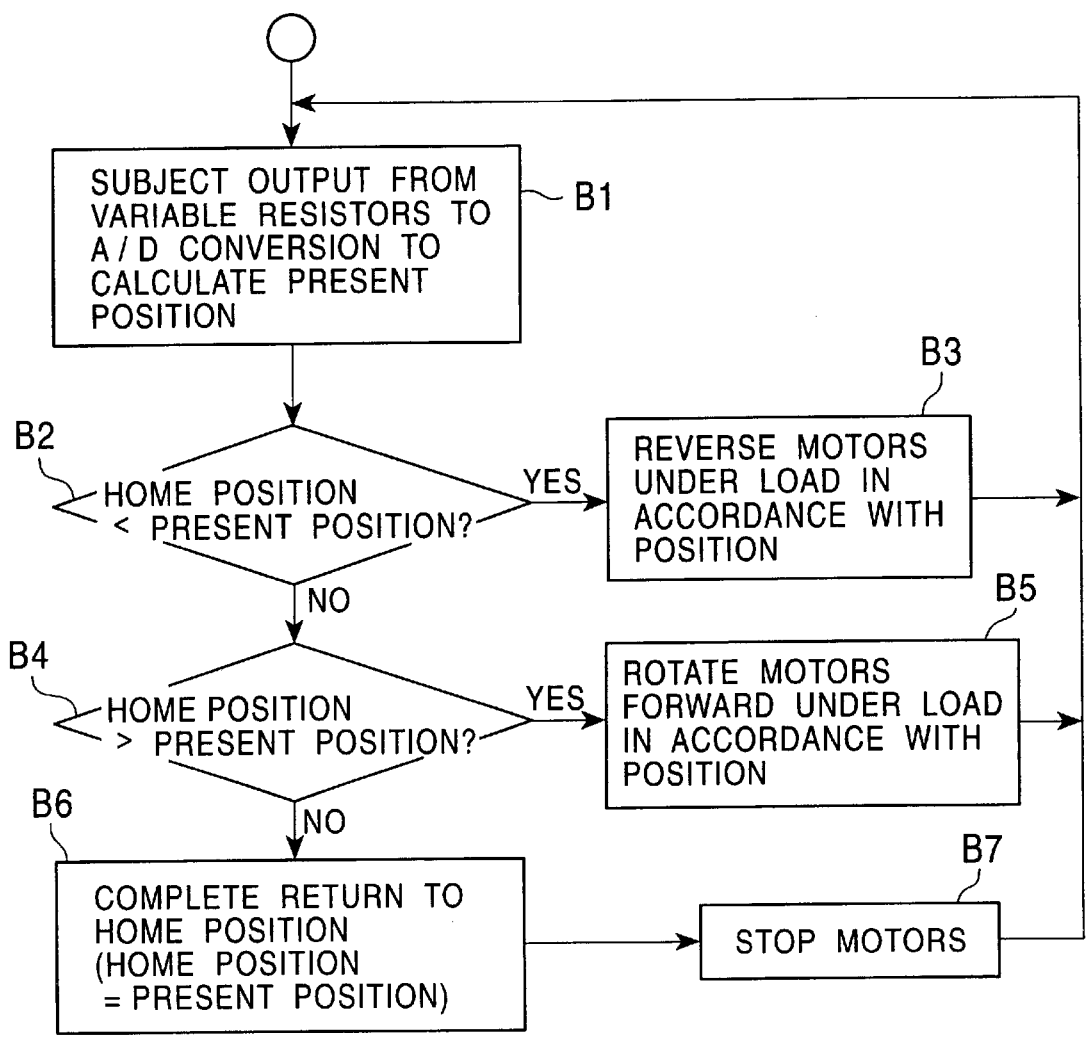
FIG. 9 is a flowchart showing a method of controlling the home position of the stick device during normal operation.

The method of controlling the position of the stick section 1 during normal operation will be described with reference to FIG. 9.

First, output signals from the variable resistors 25 and 26 are converted from analog to digital by the A/D converters 33 and 34, and the present position of the stick section 1 is calculated (Step B1). The present position of the stick section 1 can be known based on signals output from the variable resistors 25 and 26 regarding the turning directions and angles of the bevel gears 6 and 7.

Next, it is determined whether the present position of the stick section 1 has exceeded the home position (Step B2).

When the present position has exceeded the home position, the driving motors 14 and 15 are independently or simultaneously reversed under a load in accordance with the position difference to shift the position of the stick section 1 toward the home position (Step B3), and the present position of the stick section 1 is calculated again (Step B1).

In contrast, when the present position of the stick section 1 has not exceeded the home position, it is determined whether the present position lies before the home position (Step B4).

When the present position lies before the home position, the driving motors 14 and 15 are separately or simultaneously rotated forward under a load in accordance with the position difference to shift the position of the stick section 1 toward the home position (Step B5), and the present position of the stick section 1 is calculated again (Step B1).

In contrast, when the present position does not lie before the home position, it is determined that the present position coincides with the home position and that the return to the home position has been completed (Step B6), and the driving motors 14 and 15 (Step B7), thereby completing the control operation.

By thus moving the home position of the stick section 1 to an arbitrary position and determining the arbitrary position as a new home position, it is possible to perform operation with respect to the new home position serving as a new neutral position, and to achieve a more realistic operation.

As described above, according to the stick device of this embodiment, the stick gear 5 is fixed on the side of the stick turning portion 3 and in one direction orthogonal to the axis of the stick 2 so that its surface points toward the stick 2, a pair of bevel gears 6 and 7 are placed opposed to each other across the stick turning portion 3 so that the teeth thereof are meshed with the teeth of the stick gear 5. Accordingly, it is possible to incline the stick 2 centered on the stick turning portion 3 in an arbitrary direction.

Since the stick gear 5 and the bevel gears 6 and 7 are meshed, the strength of the mechanism can be increased. As a result, it is possible to further strengthen the structure of the entire input device, and to permit size reduction.

Since a difference is made between the number of teeth in the stick gear 5 and the number of teeth in the bevel gears 6 and 7, the path can be corrected by deviating the ratio between the teeth number of the stick gear 5 and the teeth number of the bevel gears 6 and 7 from 1. Moreover, it is possible to improve nonlinearity of the path of the stick section 1 when the teeth number of the stick gear 5 and the teeth number of the bevel gears 6 and 7 coincide with each other.

Furthermore, the blocks 22 and 23 are placed opposed to each other across the shaft 21 of the stick gear 5, and the opposing surfaces of the blocks 22 and 23 are provided with the concave faces 22a and 23a for slidably supporting both ends of the shaft 21. Therefore, when the stick gear 5 and the bevel gears 6 and 7 are turned, the turning fulcrum of the stick section 1 coincides with the center points of the concave faces 22a and 23a, which can prevent the turning fulcrum of the stick section 1 from being displaced.

Since the variable resistors 25 and 26 are respectively provided for the bevel gear 6 and the bevel gear 7, the turning directions and angles of the bevel gears 6 and 7 can be independently detected, and as a result, can be controlled more precisely.

Since the driving motor 14 is connected to the bevel gear 6 via the reduction gears 11a to 13a and the driving motor 15 is connected to the bevel gear 7 via the reduction gears 11b to 13b, the driving force from the driving motors 14 and 15 increases, which makes it possible to produce a desired operating force by a small driving source.

Furthermore, since the turning directions and angles of the bevel gears 6 and 7 are controlled by the control section 27 based on output signals from the variable resistors 25 and 26 and output signals from the computer game machine body, it is possible to change the load to be imposed on the stick section 1 according to the game contents displayed on the display of the computer game machine body. Therefore, the sensations of operating the stick section 1 becomes closer to actual sensations, and the game player can enjoy a more realistic game.

According to the method of controlling the home position of the stick section in this embodiment, the present position of the stick section 1 is detected, and it is determined whether the present position of the stick section 1 coincides with a designated position. When the present position coincides with the designated position, it is regarded as the home position. When the present position of the stick section 1 is different from the designated position, the stick section 1 is moved so that the present position thereof coincides with the designated position, and the designated position is regarded as the home position. Accordingly, the home position of the stick section 1 can be easily changed to an arbitrary position offset from the initial home position.

In the stick device shown in FIGS. 1 to 4, a pair of bevel gears 6 and 7 are placed opposed to each other across the stick turning portion 3 of the stick section 1, the driving motor 14 is connected to the bevel gear 6 via the reduction gears 11a to 13a, and the driving motor 15 is connected to the bevel gear 7 via the reduction gears 11b to 13b. The configuration shown in FIG. 10 may be used instead. In this configuration, a casing 41 is provided to enclose a stick turning portion (not shown) of a stick section 1, driving motors 42 and 43 are fixed to two adjoining side faces of the casing 41 so as to be directly connected to the stick turning portion from two intersecting directions, a position-detecting sensor 44 for detecting the position of the stick turning portion is fixed to a side face of the casing 41 opposed to the driving motor 42, and a position-detecting sensor 45 for detecting the position of the stick turning portion is fixed to a side face of the casing 41 opposed to the driving motor 43.

Figure 10:
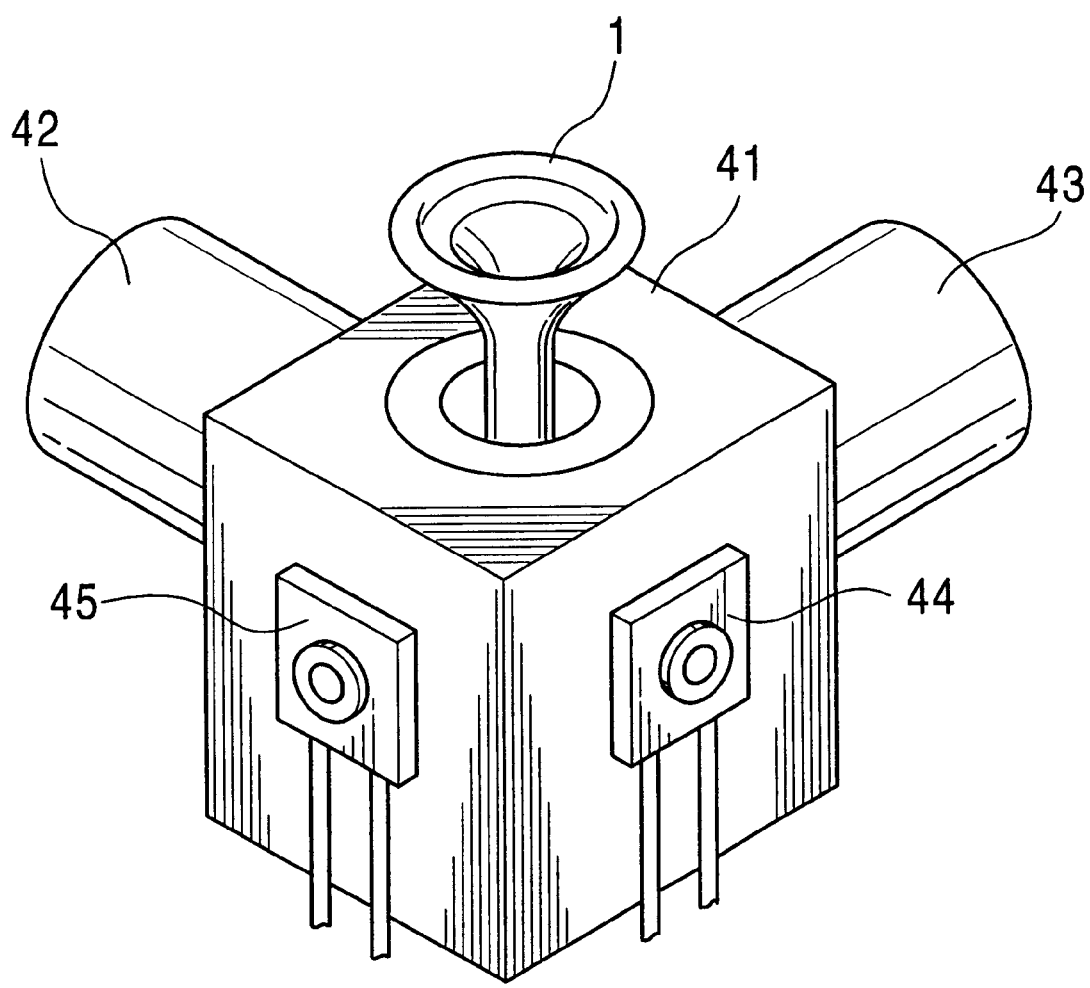
FIG. 10 is a perspective view of a stick device for a computer game machine to which a controller position control method according to a second embodiment of the present invention is applied.

In the stick device shown in FIG. 10, a method of controlling the position when a request to change the home position of the stick section 1 is received is just the same as that of the above-described stick device shown in FIGS. 1 to 4.

A method of controlling the position of the stick section 1 during normal operation is also just the same as that of the above-described stick device.

In the stick device shown in FIG. 10, the home position of the stick section 1 can also be easily changed to an arbitrary position offset from the initial home position in a manner similar to that of the above-described stick device.

Since the driving motors 42 and 43 are directly connected to the stick turning portion of the stick section 1 from two intersecting directions, the configuration is simplified, and it is possible to precisely control the position of the stick section 1 during normal operation and when a request to change the home position is received.

While the stick device and the controller position control method of the present invention have been described in conjunction with the preferred embodiments with reference to the attached drawings, it is to be understood that the invention is not limited to the disclosed embodiments, and that various design changes and the like are possible without departing from the scope of the present invention.

For example, while it is determined whether the present position of the stick section 1 lies before the designated position after it is determined whether the present position has exceeded the designated position in the above embodiments, the order of the determinations may be reverse. The present position of the stick section 1 may be caused to coincide with the designated position after the determinations are simultaneously made. Furthermore, the shapes, teeth number, teeth number ratio, and the like of the stick gear 5 and the bevel gears 6 and 7 may be appropriately changed.

What is claimed is:

1. An input device for a game machine, comprising:

a controller including a rodlike stick and a stick turning portion coaxially mounted at one end of the stick;

a first bevel gear opposing the stick turning portion and substantially orthogonal to a direction of extension of the stick such that a front surface of the first bevel gear opposes the stick turning portion, a shaft of the first bevel gear slidably supported at both ends by a first concave face and a second concave face, the first concave face opposing the second concave face;

a pair of second bevel gears disposed opposed to each other with the stick turning portion therebetween and having teeth thereof meshed with teeth of the first bevel gear;

a detector provided in each of the second bevel gears to detect turning directions and angles of the respective second bevel gear; and a pair of driving motors respectively connected to the second bevel gears to independently turn the second bevel gears, wherein a number of teeth in the first bevel gear is different from a number of teeth in each of the second bevel gears, the stick turning portion is slidably supported by a third concave face, and at least one speed reducer is interposed between each of the second bevel gears and the respective driving sources.

2. An input device for a game machine according to claim 1, further comprising a controller that controls the turning directions and angles of the second bevel gears based on signals supplied from an output of the game machine.

3. An input device for a game machine according to claim 2, wherein the controller controls the turning directions and angles of the second bevel gears by controlling driving of the driving motors based on signals supplied from an output of the detector such that the controller is turned around a turning fulcrum thereof to incline to an arbitrary angle.

4. An input device for a game machine according to claim 2, wherein driving forces of the driving motors are independently transmitted to the second bevel gears via the speed reducers, the second bevel gears are thereby turned by designated turning angles in designated turning directions and are given predetermined loads, and the turning directions and angles of the second bevel gears are detected by the detectors.

5. An input device for a game machine according to claim 4, wherein the controller recognizes a present position of the controller on the basis of signals representing the turning directions and angles of the second bevel gears detected by the detector, and independently drives the driving motors to control the turning directions and angles of the second bevel gears and to shift a home position of the controller from a neutral point to a designated position.

6. A controller position control method for controlling a position of a sticklike controller having a turning fulcrum at one end in an input device for inputting signals to a game machine using a computer, the control method comprising:

determining that a command for requesting to change a home position of the controller has been issued from the game machine;

receiving information about a designated shift position and load of the controller;

detecting a present position of the controller by a position detector;

determining whether the detected present position of the controller coincides with a designated shift position;

setting the present position of the controller as the home position when the present position coincides with the designated shift position;

turning the controller around the turning fulcrum by a driving motor such that the detected present position coincides with the designated position when the present position differs from the designated position; and setting the designated position as a new home position of the controller.

7. A controller position control method according to claim 6, wherein, when the present position of the controller differs from the designated shift position, the detection of the present position of the controller, the determination of whether the present position of the controller coincides with the designated shift position, and the turning of the controller around the turning fulcrum are repeatedly performed such that the present position of the controller coincides with the designated position, and the coincident position is regarded as the new home position.

\* \* \* \* \*